Patented Oct. 27, 1931

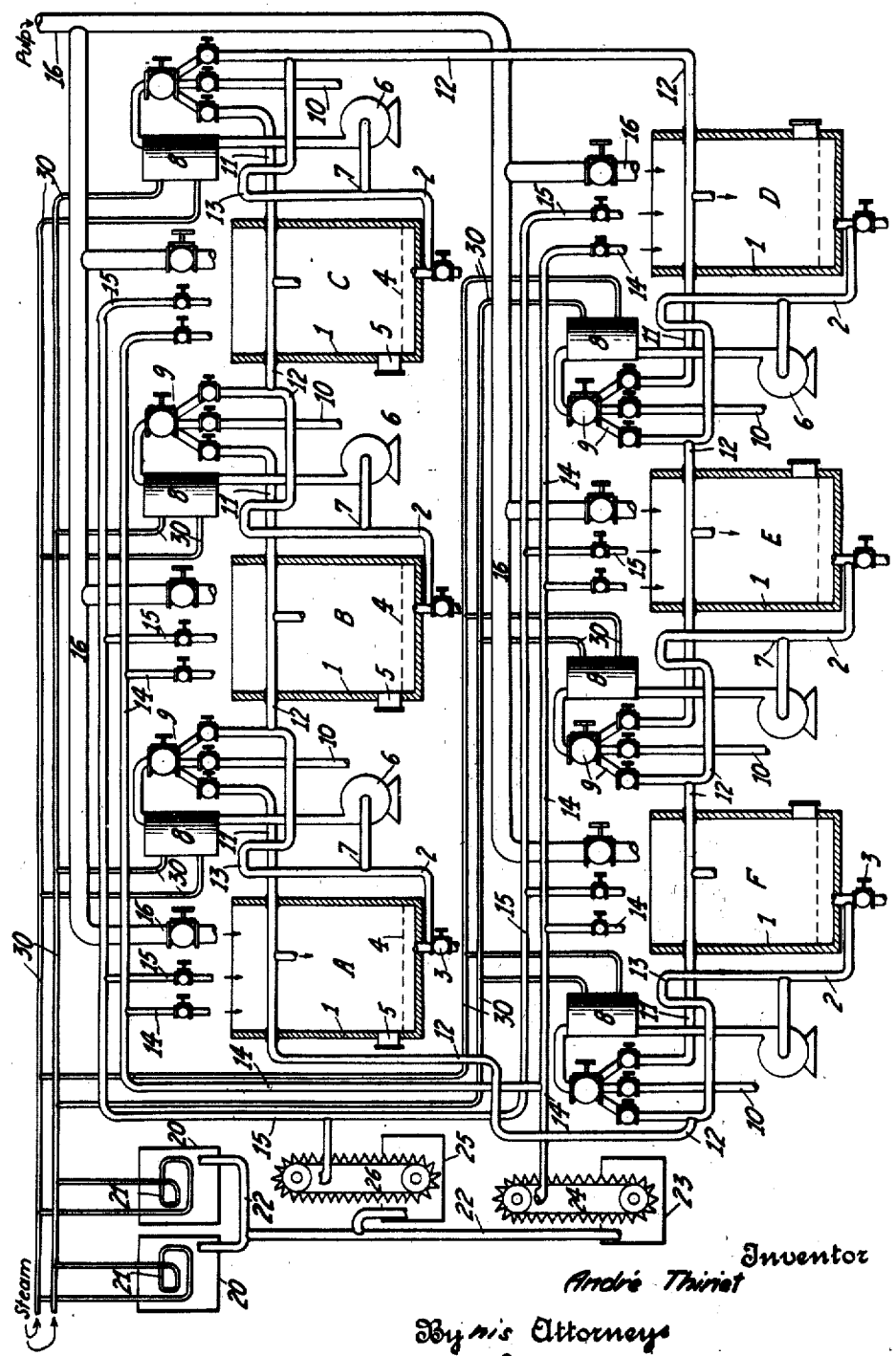

1,829,378

UNITED STATES PATENT OFFICE

ANDRÉ THIRIET, OF LYON, FRANCE, ASSIGNOR TO PAPETERIES NAVARRE, OF LYON, FRANCE, A LIMITED LIABILITY COMPANY

TREATMENT OF CELLULOSE MATERIALS

Application filed March 17, 1931, Serial No. 523,223, and in France February 15, 1928.

The invention which forms the subject of my present application (which is in part a continuation of my earlier application Serial No. 263,193, filed March 20, 1928, and in part a continuation of my earlier application Serial No. 319,636, filed November 15, 1928) relates to the treatment of cellulose-bearing material, and more particularly it relates to a process and apparatus for treating material such as wood-pulp for purification thereof, and for treating cellulose-bearing industrial wastes, plants, other vegetable substances, and the like, for the extraction of cellulose therefrom by removal of other substances.

Purification of wood-pulp, and in some instances of vegetable fibers, has hitherto been accomplished by treating the material with a liquor comprising sodium hydroxide solution, but with the available processes a product containing as much as 94 or 95 per cent pure cellulose is recovered only with difficulty, and in most cases, especially in the instance of vegetable materials other than wood-pulp, a considerably less pure product is obtained. The product, furthermore, often contains impurities which give it a dark color, and hence further treatment and extensive bleaching is necessary.

In addition, the prior methods have frequently necessitated the use not only of disadvantageously high temperatures of the nature of 150° C. or more, but also of pressures several times atmospheric, usually inconvenient and expensive to maintain in the vessels or chambers where the pulp is treated. Accordingly, the present invention includes among its principal objects, the objects of providing a process, and apparatus as well, for the treatment of cellulose, in which any or all of the recited disadvantages and inconveniences of prior methods may be obviated or materially reduced. It is a highly important object of the invention, likewise, to provide a method of purifying cellulose which will yield a product of remarkably superior purity; and it is a further object to provide a method in which the percentage of desirable cellulose recovered from a given quantity of pulp or other crude material is considerably higher than heretofore. To these ends and such others as will hereinafter appear or are incident thereto, the invention comprises the novel features hereinafter described.

In carrying out the process of the invention, one of several steps which may be followed, if desired, may comprise the treatment of pulp or other crude material with an alkali liquor to dissolve out, by reaction or otherwise, impurities soluble therein. Impurities of that class are various in nature, and among others may comprise so-called incrusting materials, as found for example in industrial wastes, plants, and other vegetable substances, or may be the impurities commonly styled beta- and gamma-cellulose as found in wood pulp and the like, from which last the product sought to be recovered is usually alpha-cellulose. Such incrusting substances, often comprising 30 to 60 per cent of the crude material, may include, for instance, pectine, mucine, lignin, suberin and the like, commonly associated with the essential celluloses in the form of cellulosic compounds. Impurities of the various classes described may be dissolved by the alkali liquor, the action being chiefly of the nature of hydrolysis accompanied by decomposition or transformation into a soluble compound comprising a reaction product of the active ingredient of the liquor; for convenience, then, such impurities may be included in the term alkali-soluble materials. Among other substances to be removed by this or other steps of the invention there may also be mentioned simple carbohydrates, albuminoids, glucoids, alkaloids, and the like, and mineral matter, one or more of which may often occur in small proportions in various cellulose-bearing crudes. An alkali liquor suitable for the treatment described may advantageously comprise a water solution of an alkali metal compound having a basic reaction in such solution, and among such compounds it has been found that not only sodium hydroxide but in lieu thereof sodium carbonate may advantageously be employed.

Mention has already been made of earlier processes wherein it has been sought to purify wood-pulp and the like by means of a sodium hydroxide treatment, but in the practice of such previous methods several important factors in many respects militating against efficiency have prior to this invention been overlooked or misunderstood. In the first place, after a certain amount of alkali-soluble material has been dissolved in, for instance, a sodium hydroxide solution, the dissolving of a fresh quantity of such material is resisted, apparently because an equilibrium becomes established between the dissolved and undissolved material; consequently, for example, the customary method of treating crude pulp and the like with fresh sodium hydroxide solution at a given temperature does not effect a complete or efficient purification. To overcome this equilibrium, it has hitherto been proposed to carry out the treatment with greater heat, at temperatures well above 100° C., such as 130° C. or more. At such temperatures, however, sodium hydroxide attacks the essential pure cellulose itself very readily, hydrolyzing and decomposing it along with the undesired alkali-soluble impurities, even in NaOH solutions of low concentration. At 130° C., for instance, a 2 per cent solution of NaOH will dissolve over 50 per cent of cellulose within a few hours, while the same cellulose can remain for several days in the presence of a 2 per cent solution at 80° C. without appreciable decrease in weight. Consequently, when for example a batch of fibrous vegetable substance is treated with a fresh, concentrated, and very hot solution of sodium hydroxide, the outer cellulose fibers are soon attacked, with the result of a loss of useful cellulose and a waste, by unnecessary reaction, of the sodium hydroxide. Moreover, the treating solution rapidly assumes a dark color because of the various organic substances dissolved therein, becoming especially black at the higher temperatures and in the presence of dissolve or hydrolyzed cellulose. The cellulose product of such treatment inevitably receives an undesirable dark coloration thereby, as it is impregnated with the black solution, and much trouble has been encountered in cleaning and bleaching the cellulose obtained.

It has now been found, too, that certain of the impurities accompanying the various crude pulps and vegetable substances combine, to form insoluble compounds, with alkaline-earth salts (especially those of calcium) present in the ordinary water used in the treating solution, or often present in the treated material itself; and since these insoluble compounds are not displaced by sodium hydroxide the latter fails to dissolve or remove the class of impurities referred to. Moreover, there are likewise certain impurities, occurring for instance in various vegetable substances, which are soluble in water and which when so dissolved react with and neutralize sodium hydroxide. Consequently, on treating a batch of crude material of such nature, with fresh hot solution according to prior methods such as described above, these water-soluble impurities neutralize to no purpose a portion of the sodium hydroxide.

In recognition of these various difficulties, it is an important object of the present invention to minimize them in economical and readily practicable fashion. To that end, the step comprising treatment with an alkali liquor as hereinabove mentioned may advantageously be carried out by treating a given batch of crude cellulose-bearing material with successive quantities of alkali liquor, each quantity differing from the preceding quantity in that it contains a greater proportion of the active alkali-metal compound and is charged with a less proportion of impurities dissolved out of previous batches of crude material which it has been used for treating. Thus the first quantities of liquor employed have their active ingredient more or less spent by previous use, but they serve to initiate hydrolysis and removal of alkali-soluble impurities, and particularly to extract such water-soluble impurities as are present, the latter being dissolved even after complete neutralization of the alkali liquor. The succeeding liquors then serve to remove gradually the alkali-soluble impurities, and the final quantity may be a fresh clear solution of the active alkali-metal compound, to accomplish removal of the last traces of alkali-soluble substances. By so using successive quantities of liquor, the treatment may be carried out at temperatures substantially lower than those of prior methods, and without the introduction of inconvenient high pressures as hitherto required. For that and other reasons, including the fact that the alkali liquor may be of relatively low concentration, even at the last, attack of essential pure cellulose is in great measure avoided. A product of remarkable whiteness and purity results thereby, and not only is no more of the active alkali-liquor ingredient used up than necessary, but owing to the greater concentration of the black liquors the recuperation thereof is more economically effected. This recuperation involves in general a calcination and subsequent caustification of the solid ingredient of the liquor; the process being even more simple in the case of sodium carbonate liquor, since there is no caustification needed.

In order to further enhance the purity and light color of the cellulose produced, the treatment may advantageously be carried out in the absence of alkaline-earth salts, as for example by using only alkali liquors from which such salts have been removed, so that dissolving of impurities is unimpeded and no undesirable substances are precipitated out of solution. A final operation of this step of the invention may comprise washing the purified cellulose with clear water,—which may also to advantage be freed of alkaline-earth salts,—whereby all remaining traces of alkali-liquor and accompanying alkali-soluble impurities are removed.

The method of carrying out the alkali liquor step by treating the crude material with successively purer quantities of liquor may be practiced, in a manner desirable for commercial purposes, for instance, by treating simultaneously a plurality of batches of material in as many vats or tanks. These vats can conveniently be arranged in what may be figuratively styled an "annular" series, liquor being transferred from vat to vat as if the vats were arranged in the form of a ring. Thus, for example, at any given time the material in the several vats will be undergoing all stages of purification: a vat, for instance, which has just been charged with crude material, is receiving treatment with liquor which has passed through all the other vats, while in the next following vat material which has undergone all of the purifying stages (with a succession of liquors that have passed through a number of vats successively varying from all to one) is receiving treatment with fresh, clear liquor (which then will pass through all other vats in the manner stated) prior to withdrawal as pure cellulose, or washing if desired. The several vats can thus be successively emptied and recharged with material serially about the ring, the succession of such operations in the vats following the same direction as the transfer of liquor,—which, as will now be understood, always passes from a vat of thoroughly purified material through all other vats in succession to a vat which has just received a new charge of crude material. One form of apparatus satisfactory for carrying out the alkali liquor step according to this continuous process is shown in the accompanying drawing and will be hereinafter described.

The process of the invention may comprise other steps than the alkali liquor treatment hereinabove described, among which may be included if desired a physical purification. The latter may advantageously be carried out before the alkali liquor step or other chemical treatment, and its object is to remove, in satisfactory manner, certain impurities physically adherent to the fibers of the crude material, and thus in many cases to avoid contaminating or impeding a succeeding chemical treatment with such impurities. These impurities, for example, may include, notably in the case of wood pulps such as sulfite pulps or others, three classes of substances: (a) the divergent layers or medullary rays, very rich in lingnin; (b) waste fibers, comprising more or less spoilt cellulose, and unfit for some commercial uses such as the preparation of cellulose ethers; (c) particles of various materials, such as silica, calcium resinate, neutral sulfite of lime, hydroxide of iron, and the like, which adhere very tightly to the fibers. This physical purification may be conveniently accomplished by subjecting the pulp or other crude material, previously put in suspension in water, to water jets of sufficient velocity to dislodge and carry off the minute particles of impurities and short fibers which comprise substances of the nature described.

An apparatus suitable for this treatment may comprise, for example: (1) an inclined wire gauze upon which the diluted pulp or other crude material is continuously poured; (2) one or more streams or jets of water that run through the pulp and carry off the solid particles and the like, the velocity of the water being so regulated as to exert on the particles a pressure greater in value than the forces of attraction existing between the fibers sought to be purified and the particles.

Following this treatment the pulp or other material may then if desired be brought to a concentration of from 4 to 6 percent, suitable for an alkali liquor purification or such other chemical treatment as may thereafter be carried out.

Another step in the process of the invention may comprise the elimination of alkaline-earth salts contained in the cellulose, and whereas the earlier stages of an alkali liquor treatment in a manner hereinabove described may serve satisfactorily to remove such substances, they may advantageously be removed, for example, by preliminarily washing the pulp or other material with water free from alkaline-earth salts.

Other steps in the process, which may in some instances be found desirable, and which may conveniently be performed after the pulp or other material has received an alkali liquor treatment, include bleaching with a suitable oxidizing agent, as where the material is of an especially dark color, and final elimination of such mineral salts as may be carried by the cellulose, the latter operation being effected by the action of an acid solution wherein the pH is such as to reduce as much as possible the adsorption of the mineral salts by the cellulose.

Referring now to the accompanying drawing illustrating diagrammatically one form of apparatus suitable for carrying out the alkali liquor step of the invention, there are shown a plurality of sections of apparatus, A, B, C, D, E and F, each comprising a vat or tank with accompanying tubes, valves, outlets, etc., as hereinafter described.

Each section includes a cylindrical vat 1, capable of containing a batch of pulp or other crude material to be treated. From the bottom of the vat leads a tube 2 extending vertically upward to a level near the top of the vat, where the latter may be open to the atmosphere, said tube being provided with a draining sluice valve 3. The vat 1 is fitted with a perforated false bottom 4 that prevents the fibers of treated material from passing through, thus permitting only the liquid in which the material is in suspension to filter through. Above this perforated bottom is a plug 5 for blowing out the pulp or other material. A pump 6 is provided for the circulation of alkali liquor and the like through the apparatus. It sucks the alkali liquor from tube 2 above a certain point 7 which determines in the vat the lowest level below which the liquor can not drop, and delivers it to a heater 8 so regulated as to maintain constant the temperature of the circulated liquor. At the outlet from said heater is a selecting device 9 which permits, without any risk of the fluids becoming mixed, the liquor to be led either into discharge piping 10 (if it is exhausted or spent), or into piping 11 which leads it into the vat wherefrom it came (so as to obtain a closed circulation), or into the next vat by way of piping 12. On the drawing, a simple valve has been indicated on each conduit, but multiple-way valves might obviously and advantageously be utilized for this service. In piping 12 is provided an overflow 13 which insures the return of any excess of liquor to the vat wherefrom it came, in such manner as to thereby determine for the next vat an upper level which the liquid therein must not exceed.

It will be apparent therefore that, due to the arrangement of the piping system and its fixtures, the level of the liquor is stabilized in all the vats. Furthermore, it will now be seen that the set of apparatus may at a given time assume either one of the two following conditions:

I. One of the vats, such as A, which has previously been emptied, is being charged with pulp or other material to be treated; while the next vat B, the pulp of which has been completely treated and washed, is being emptied, and in the succeeding vat C the pulp which has been entirely treated is being washed with ordinary water. All the other vats, such as D, E, F, are being treated, and have their liquor circulating in a closed circuit.

II. A vat such as D, the treatment of which has just been completed, receives through piping 14 a supply of water free from alkaline-earth salts in order to carry out the pulp-washing operation similar to that just completed in vat C. This purified water displaces an equal amount of diluted liquor which is sent by the pump into the next vat E. This second vat E contains pulp that has to undergo the last part of the treatment; said vat receiving, therefore, the last-mentioned diluted liquor and, through piping 15, a quantity of fresh liquor accurately measured as hereinafter stated and corresponding to the amount required for treating the weight of pulp that is being purified. The liquor so displaced in this vat E by the diluted liquor and the fresh liquor is forced by the circulating pump of said vat through piping 12 into the next vat F, and so on through such other vats, not shown, as may be placed in the series. All such other vats, together with their pumps, are simultaneously put in the same position, and the successively displaced liquors, which are circulated from one vat to the next one, become more and more charged with alkali-soluble substances and the like. Finally, the last vat A, which has just been charged with fresh pulp, may receive through piping 14 purified water for a preliminary washing, while the liquor withdrawn by the pump from the preceding vat (here vat F, other intermediate vats not being shown) is discharged through piping 10. This latter liquor has run through the whole cycle of vats and is considered as exhausted.

The pulp is charged into the vats where it may conveniently reach a concentration of from 5 to 7 per cent, this concentration being kept constant throughout the treatment. As the liquor in which the pulp is suspended is moving downwards, it tends to lead the pulp to the bottom of the vat and, consequently, a layer of liquid free from fibers is formed in the upper part, which helps the treatment to be perfectly uniform, as no pulp can stay out of the circulating liquid.

Due to the action of the heaters, the circulated liquors are heated up to a temperature which may be maintained as constant as desired. This temperature may conveniently be less than 100° C., if it is desired to carry out the operations under atmospheric pressure, and may lie within various advantageous ranges, depending on the material treated and the nature of the liquor. Using, for instance, a 4 per cent solution of sodium hydroxide, a temperature of 70° to 80° C. is desirable for sulfite pulp; 70° to 95° C. for slightly lignified vegetable substances, such as straw, Spanish grass, etc., and slightly higher temperatures for certain other substances, as woods in current use. Soda pulp may be efficiently treated with a cold concentrated solution of sodium hydroxide (about a 10 per cent solution) and in that case the heaters 8 may be dispensed with. If sodium carbonate is used, for example in about an 8 per cent solution, the various materials may advantageously be treated at temperatures between 90° and 100° C.

The exhausted liquors that are discharged contain recoverable matters and an amount of heat which can be utilized for liquor preparation. These liquors are collected in a collector piping to which the several pipes 10 lead; and once the alkaline treatment has been completed, washings are effected according to the same liquid displacement method. In practice, a volume of water equal only to once and a half the capacity of the vat concerned has to be introduced in order to insure a complete washing of material.

The number of vats under treatment may vary as desired, but in general may be determined, on the one hand, by the time which is required for complete removal of alkali-soluble impurities from the pulp (the treatment may be considered as completed within 45-50 hours for sodium hydroxide liquor and about 70 hours for sodium carbonate liquor), and, on the other hand, by the time required for charging and for emptying one vat, which time determines the period during which the vats are placed in accordance with the above-described arrangement "I". In fact, the vat that has just been charged with unpurified pulp is ready for emptying only after all the liquors from the other vats have been circulated through its own pulp contents, each successive liquor being less charged than the next previous one with dissolved substances, and the last one being a fresh liquor.

Each of the vats of the plant is thus in turn ready for emptying and for fresh charging, the above conditions "I" and "II" alternating without cessation. The feeding or charging of the vats is effected through pipes 16 or other feeding apparatus which may take the pulp or other material from the concentrating screens located, for instance, at the outlet of a physical purifying apparatus if such is used, while emptying is effected through plug-holes 5 by means of a pressure water jet. The purified pulp carried along is collected in a collector, whence it is sent to apparatus for use or succeeding treatment as desired.

It will be seen that the treating vats or tanks thus constitute an "annular" series appropriate for the process, the transfer of liquor from vat to vat taking place as if the vats were arranged in the form of a ring and the emptying and recharging of the successive vats taking place in the same manner. Thus, if the vat A in the drawing has just been charged, the next vat to be emptied will be vat B, followed by vat C, then vat D, and so on, and finally vat A will be emptied again and recharged. In the meantime the separate batches or lots of material in the vats are being treated with the liquors which have been transferred from one vat to the next.

The preparation of liquors and waters necessary for the above described process may be effected with the following apparatus, also diagrammatically shown in the drawing:

1. A series of decanting troughs 20 for purifying the water. The alkaline-earth salts in the latter are precipitated hot or cold by means of a very small quantity of caustic soda; in the case a hot precipitation is preferred, said troughs may be heated by steam coils 21 supplied with steam by pipes 30, which last may also lead to the heaters 8.

2. A distributing trough 23 for purified water, which trough may receive water, decanted from troughs 20, through piping 22. A distributing device 24, whose rate of flow can be regulated, delivers the water to the several vats as desired through piping 14.

3. A distributing trough 25 for alkali liquor, which trough receives, through piping 22, purified water and the predetermined weight of suitable alkali-metal compound corresponding to the volume of the trough, so as to obtain solutions comprising, for instance, the strengths hereinabove mentioned. Another distributing device 26 is mechanically coupled with the preceding distributor 24 and supplies to conduits 15, with all the required accuracy, the volume of alkali liquor corresponding to the weight of pulp to be treated. In using sodium hydroxide, for instance, the amount of the latter so introduced may conveniently be from 4 to 12 per cent of the weight of material such as sulfite pulp, or up to about 20 per cent for other vegetable substances. In employing sodium carbonate, it has been found that the $Na_2CO_3$ consumption may be about 16 to 25 per cent of the weight of the material treated.

If it is desired to employ the bleaching step hereinabove described, as for example in the case of wood pulp and the like, a bleaching plant suitable to receive the pulp after its alkali liquor treatment may be composed of vertical vats having a volume slightly greater than that of the alkali liquor vats. The inner lining or the constituent material of the bleaching vats may be so selected as to withstand, without being attacked, the action of the bleaching solution and the action of the liquor used for such subsequent acid treatment as may be employed, if any; and said vats are also provided with a perforated false bottom, with a blow-out plug, and with a circulating pump that collects the liquor that has filtered through the said perforated bottom and delivers it again to the upper part of the vat. The pulp therein may have an average concentration of from 4 to 6 per cent.

Through suitable piping, a bleaching solution containing, for instance, calcium hypochlorite to the amount of 1 to 3 per cent of the weight of the pulp, in the case of sulphite or soda pulp, and of 13 to 18 per cent of the weight of the pulp in the case of vegetable substances, is introduced thereinto. The bleaching action is also fostered by the liquor being circulated, and it may last for from 4 to 6 hours. In order to avoid any alteration of the fibers under treatment, this operation may advantageously be performed at a temperature not exceeding 25-30° C. The bleaching step may be followed by a very thorough washing with ordinary water by displacement. Finally, if desired, an acid treatment step may be pursued as mentioned hereinabove, for the removal of mineral salts which have been fixed by adsorption on the fibers of cellulose. The treatment may be conveniently carried out, in the same vat as the bleaching, by circulating, for example, a 0.1 per cent sulfuric acid solution through the material for about an hour. After further washing, the purification of cellulose is complete, and the batch of material may then be directly used for any desired purpose.

In the special case of soda pulp, it is advantageous in some cases to precede the alkali liquor treatment with an oxidation step. In such case, the cellulose which, after physical purification, has a concentration of from 4 to 6 per cent, is oxidized by means of, for instance, a solution of calcium hypochlorite. This operation does not essentially differ from already known cellulose bleaching processes, but it should be carried out, however, in such a way that the bleaching will be quite homogeneous.

The amount of active oxygen used should be so calculated as to obtain total oxidizing of the lignin; for instance, 10 per cent of calcium hypochlorite should be used for ordinary soda pulp. After oxidizing, the cellulose is washed and then dried to a concentration of from 300 to 400 grams per liter, by means of any suitable device in common practice (cylinder mold, screw press, rotary strainer, etc.). Both the oxidizing and the washing are effected in ordinary bleaching apparatus. The soda pulp may then be rediluted with water or spent alkali liquor and treated according to the alkali liquor step as above described.

It is to be understood that the invention is not limited to the specific procedures and apparatus herein described, but can be carried out in other ways without departure from its spirit as defined by the following claims.

What is claimed is:

1. Process of purifying cellulose-bearing material, comprising treating the material with alkali liquors free from alkaline-earth salts whereby the dissolving of the impurities is unimpeded by the presence of such salts and the impurities when dissolved are retained in solution.

2. Process of purifying cellulose-bearing material comprising treating the material with alkali liquors free from alkaline-earth salts whereby the dissolving of impurities is unimpeded by the presence of such salts and the impurities when dissolved are retained in solution, treating the material with dilute acid to dissolve mineral compounds which remained fixed on the cellulose after the treatment with alkali liquor and thereafter washing the material to eliminate the dissolved mineral compounds.

3. Process of purifying cellulose-bearing material, comprising washing the material with water which is free from alkaline-earth salts, and thereafter treating the material with alkali liquor which is free from alkaline-earth salts for the removal of soluble impurities.

4. Process of purifying cellulose-bearing pulp, comprising subjecting the pulp to water jets of sufficient velocity to dislodge and carry off minute adherent particles of impurities and short fibers, thereafter treating the pulp with alkali liquor which is free from alkaline-earth salts for the removal of soluble impurities.

5. Process of purifying cellulose-bearing pulp, comprising subjecting the pulp to water jets of sufficient velocity to dislodge and carry off minute particles of impurities and short fibers, washing the pulp with water which is free from alkaline-earth salts, and thereafter treating the pulp with alkali liquor which is free from alkaline-earth salts for the removal of soluble impurities.

6. Process of purifying cellulose-bearing pulp, comprising subjecting the pulp to water jets of sufficient velocity to dislodge and carry off minute particles of impurities and short fibers, and thereafter washing the pulp with water which is free from alkaline-earth salts.

7. In a process of purifying cellulose-bearing pulp, subjecting the pulp to water jets of sufficient velocity to dislodge and carry off minute adherent particles of impurities and short fibers.

8. In a process as described in claim 7, in which the pulp is subjected to jets of water of sufficient velocity to dislodge and carry off minute adherent particles of impurities and short fibers, by passing the pulp in the form of a layer or sheet under the water jets, which latter are directed downwardly into the flowing layer of pulp from above.

9. Process of purifying cellulose-bearing pulp, comprising subjecting the pulp to water jets of sufficient velocity to dislodge and carry off minute particles of impurities and short fibers, washing the pulp with water which is free from alkaline-earth salts, treating the pulp with alkali liquor which is free from alkaline-earth salts for the removal of soluble impurities, and subsequently washing the treated pulp with water which is free from alkaline-earth salts.

10. Process of treating cellulose-bearing materials, comprising subjecting the pulp to water jets of sufficient velocity to dislodge and carry off minute adherent particles of impurities and short fibers; establishing in an annular series of vats, batches of the pulp of successively greater impurity and treating the batches with alkali liquor free from alkaline-earth salts; transferring liquor from batch to batch in succession in the direction of lesser purity of the pulp whereby the liquor as it becomes increasingly charged with impurities acts upon batches of successively greater impurity; substituting untreated batches of material for the treated batches in succession as the treatment thereof is completed, the order of the successive substitutions being in the same direction as the transfer of liquor from batch to batch; and from time to time discharging the liquor from the treated batch of greatest impurity and supplying fresh pure liquor to the treated batch of least impurity.

11. Process of treating cellulose-bearing material, comprising washing the material with water free from alkaline-earth salts; establishing in an annular series of vats, batches of the washed material of successively greater impurity and treating the batches of material with alkali liquor free from alkaline-earth salts; transferring the liquor from batch to batch in succession in the direction of lessor purity whereby the liquor as it becomes increasingly charged with dissolved impurities acts upon batches of successively greater impurity; substituting untreated batches of material for the treated batches in succession as the treatment thereof is completed, the order of the successive substitutions being in the same direction as the transfer of liquor from batch to batch; and from time to time discharging the liquor from the treated batch of greatest impurity and supplying fresh pure liquor to the treated batch of least impurity.

12. Process of treating cellulose material with alkali liquor adapted to dissolve impurities therefrom, comprising establishing in an annular series of vats, batches of partially purified material of successively greater impurity; transferring liquor from batch to batch in succession in the direction of lesser purity whereby the liquor as it becomes increasingly charged with impurities is caused to treat batches of successively greater impurity, the treatments being carried out at a pressure not substantially greater than atmospheric; substituting untreated batches of material for the treated batches in succession as the treatment thereof is completed, the order of the successive substitutions being in the same direction as the transfer of liquor from batch to batch; and at the same time discharging the liquor from the treated batch of greatest impurity and supplying fresh pure liquor to the treated batch of least impurity.

13. Process of treating cellulose-bearing material, comprising treating successive bodies or batches of the material in separate vats with a solution of an alkali-metal compound having a basic reaction in such solution, said solution being free from alkaline-earth salts, and while retaining the batches in their respective vats transferring the solution from vat to vat in such manner that as the batches of the material become progressively purer they are treated with progressively purer alkali-metal compound solution.

14. Process of treating cellulose-bearing material, comprising passing successive quantities of alkali liquor at atmospheric pressure through a vat containing the material, to remove alkali-soluble impurities, the said quantities of liquor being successively less charged with impurities of such character as are removed from cellulose-bearing material by treatment with alkali liquor.

15. Process of purifying cellulose-bearing material such as wood pulp, comprising treating the material with alkali liquor comprising a solution of sodium carbonate, whereby alkali-soluble impurities are removed.

16. Process of purifying cellulose-bearing material such as wood pulp, comprising treating the material at atmospheric pressure with alkali liquors comprising sodium carbonate solution to remove alkali-soluble impurities.

17. Process of purifying cellulose-bearing material such as wood pulp, comprising treating the material with successive quantities of alkali liquor comprising sodium carbonate solution to remove alkali-soluble impurities, the said quantities of liquor being successively richer in active sodium carbonate content.

18. In a process of purifying cellulose-bearing material, the step of passing a quantity of alkali liquor at atmospheric pressure through a series of batches of said material to remove therefrom soluble impurities, the batches of said series being, in order, of successively decreasing purity and the liquor being passed through all of said batches in order, from the batch of highest purity to that of least purity.

19. Process of purifying cellulose-bearing material such as wood pulp, comprising treating the material, at a temperature above about 90° C. and below about 100° C., with successive quantities of alkali liquor comprising sodium carbonate solution to remove soluble impurities, the said quantities being successively richer in active sodium carbonate.

20. Process of purifying cellulose-bearing material, comprising passing through a vat containing the material successive quantities of alkali liquor at a temperature below about 100° C., said liquor comprising a solution of an alkali-metal compound having a basic reaction in such solution, to remove alkali-soluble impurities; the said quantities of liquor being successively richer in content of active alkali-metal compound.

21. Process of purifying cellulose-bearing material comprising treating the material at a temperature below about 100° C. with successive quantities of alkali liquor comprising a solution of an alkali-metal compound having a basic reaction in such solution, to remove alkali-soluble impurities, the solution being free from alkaline-earth salts and the said quantities of liquor being successively richer in content of active alkali-metal compound.

22. The process of claim 21 in which the treatment with successive quantities of alkali liquor is followed by the operation of washing the treated material with water free from alkaline-earth salts.

23. The process of claim 21 in which the treatment with successive quantities of alkali liquor is followed by a bleaching operation comprising treating the cellulose material with a solution containing calcium hypochlorite, the said operation being performed at a temperature not substantially greater than 30° C.

24. Apparatus for the simultaneous and progressive treatment of cellulose material in separate lots or batches of progressively different degrees of purity, comprising an annular series of vats for the batches of material, means for transferring treating liquor from vat to vat in succession under atmospheric pressure and without transfer of the material whereby as the successive batches become purer they are treated with purer and purer liquor, means at each vat for circulating the treating liquor therein during the intervals between transfers of liquor, means at each vat for discharging spent liquor from the system, means for discharging fully treated material from the vats in succession as the treatment of the successive batches is completed, and means for delivering fresh treating liquor to the vats in succession for final treatment before discharge of the material.

25. Apparatus for the simultaneous and progressive treatment of cellulose material in separate lots or batches of progressively different degrees of purity, comprising an annular series of vats for the batches of material, means for transferring treating liquor from vat to vat in succession under atmospheric pressure and without transfer of the material whereby as the successive batches become purer they are treated with purer and purer liquor, means, associated with said transferring means, at each vat for circulating the treating liquor therein, means at each vat for discharging spent liquor from the system, means for discharging fully treated material from the vats in succession as the treatment of the successive batches is completed, means for delivering fresh treating liquor to the vats in succession for final treatment before discharge of the material, and means for delivering untreated material to the vats in succession as they are emptied of fully treated material.

26. Apparatus for the simultaneous and progressive treatment of cellulose material in separate lots or batches of progressively different degrees of purity, comprising an annular series of vats for the separate batches of material, a pump at each vat for withdrawing treating liquor therefrom; piping extending from vat to vat; valve means at each vat connected with the pump thereat and said piping and operable to deliver to the same vat the liquor withdrawn therefrom by the pump, or to deliver the liquor to the next succeeding vat, or to discharge the liquor from the series, as desired; means for discharging fully treated material from the vats in succession; and means at each vat for delivering fresh treating liquor thereto for the last stage of the treatment of the material as liquor is discharged from a preceding vat of the series.

27. Apparatus for the simultaneous and progressive treatment of cellulose material in separate lots or batches of progressively different degrees of purity, comprising an annular series of vats for the separate batches of material, a pump at each vat for withdrawing treating liquor therefrom; piping extending from vat to vat; valve means at each vat connected with the pump thereat and said piping and operable to deliver to the same vat the liquor withdrawn therefrom by the pump, or to deliver the liquor to the next succeeding vat, or to discharge the liquor from the series, as desired; means for discharging fully treated material from the vats in succession; means at each vat for delivering fresh treating liquor thereto for the last stage of the treatment of the material as liquor is discharged from a preceding vat for the series; and means at each vat for delivering water thereto for washing the fully treated material before the discharge thereof from the vat.

28. In an apparatus for the simultaneous and progressive treatment of cellulose material in separate lots or batches of progressively different degrees of purity, an annular series of vats each having means for the discharge of fully treated material therefrom; means for delivering untreated material to the individual vats in succession, means at each vat for withdrawing treating liquor therefrom, liquor-transfer piping for the series of vats, liquor-distributing means connected with the transfer piping at each vat for selectively returning liquor to the vat, delivering it to the next vat in order, or discharging it from the series, the said distributing means being capable of distributing liquor from a vat operated at a pressure therein not substantially greater than atmospheric; and means at each vat for supplying fresh unused liquor to replace liquor discharged from the series.

In testimony whereof I hereto affix my signature.

ANDRÉ THIRIET.

liquor from a vat operated at a pressure therein not substantially greater than atmospheric; and means at each vat for supplying fresh unused liquor to replace liquor discharged from the series.

In testimony whereof I hereto affix my signature.

ANDRÉ THIRIET.

DISCLAIMER 1,829,378.—*André Thiriet*, Lyon, France. TREATMENT OF CELLULOSE MATERIALS. Patent dated October 27, 1931. Disclaimer filed September 9, 1932, by the assignee, *Papeteries Navarre*.

Therefore disclaims from the scope of each of claims 7 and 8 in said Letters Patent any process of purifying cellulose-bearing pulp except processes in which the pulp travels down an inclined screen while being subjected to the water jets passing through the pulp.

[*Official Gazette October 4, 1932.*]

DISCLAIMER 1,829,378.—*André Thiriet*, Lyon, France. TREATMENT OF CELLULOSE MATERIALS. Patent dated October 27, 1931. Disclaimer filed September 9, 1932, by the assignee, *Papeteries Navarre*.

Therefore disclaims from the scope of each of claims 7 and 8 in said Letters Patent any process of purifying cellulose-bearing pulp except processes in which the pulp travels down an inclined screen while being subjected to the water jets passing through the pulp.

[*Official Gazette October 4, 1932.*]